United States Patent [19]

Hiers et al.

[11] Patent Number: 4,948,649
[45] Date of Patent: Aug. 14, 1990

[54] INTEGRAL TEXTILE COMPOSITE FABRIC

[75] Inventors: John J. Hiers, Elkin; Frank C. Burroughs, Winston-Salem, both of N.C.

[73] Assignee: Lydall, Inc., Manchester, Conn.

[21] Appl. No.: 390,746

[22] Filed: Aug. 8, 1989

[51] Int. Cl.⁵ .............................................. B32B 3/14
[52] U.S. Cl. ...................................... 428/77; 28/107; 428/78; 428/190; 428/281; 428/282; 428/283; 428/284; 428/285; 428/286; 428/300
[58] Field of Search ................. 428/300, 285, 234–236, 428/301, 280, 282, 247, 253, 77, 78, 190, 281, 283, 284, 286, ; 28/107

[56] References Cited

U.S. PATENT DOCUMENTS

4,522,876  6/1985  Hiers .................................... 428/285

Primary Examiner—Marion C. McCamish
Attorney, Agent, or Firm—Griffin, Branigan & Butler

[57] ABSTRACT

There is provided an integral textile composite which fabric comprises a substrate portion having at least one organic textile fiber layer and an insulating portion. The insulating portion has at least one inorganic fiber layer which is substantially co-extensive with the organic fiber layer, and at least one insulating layer of insulating material which is substantially less than co-extensive with the inorganic fiber layer. A plurality of first needled stitches composed of organic fibers from said organic fiber layer of said substrate portion are needled in and disposed at least substantially through the insulating portion, while the inorganic fibers of the inorganic fiber layer in the insulating portion are substantially undisturbed. The number of said stitches is sufficient that the insulating portion is substantially non-detachable from the substrate portion and the substrate portion is essentially free on its outer surface from inorganic fibers from the inorganic layer or insulating material from the insulating layer of the insulating portion.

29 Claims, 2 Drawing Sheets

INTEGRAL TEXTILE COMPOSITE FABRIC

The present invention relates to an integral composite fabric of, principally, non-woven, needled fibers, and more particularly to such a composite having at least one organic fiber layer, at least one inorganic fiber layer, and at least one insulating layer (which may or may not be fibrous) and where the layers are substantially non-detachable from each other and the organic fiber layer is essentially free, at least on its outer surface, of inorganic fibers or insulating material from the inorganic fiber layer and the insulating layer

BACKGROUND OF THE INVENTION

Needled textile fabrics are normally composed of synthetic organic textile fibers, e.g. polyester, needled together into a consolidated mat. While such fabrics may also be made of natural organic fibers, e.g. cotton, these natural fibers are capable of being formed into a non-woven fabric of substantial properties by the more traditional process, e.g. felting, and hence, are not usually needled to form a non-woven fabric. Inorganic fibers, on the other hand, such as glass fibers, are not normally either felted or needled, but are consolidated into a fabric of, generally, low physical properties by an air lay or wet lay process. This is because inorganic fibers, by virtue of the materials and process of producing, have very little crimp therein, are of high modulus and substantially brittle, all of which do not lend the inorganic fibers to being either carded, needled or felted. U. S. Pat. No. 3,608,166, for example, details the difficulties in needling glass fibers. Limited needling has been done, however, for the purpose of lightly tacking a glass fiber batt. U.S. Pat. No. 3,338,777 teaches that the ability to needle glass fibers can be improved by crimping those fibers, but this is quite unacceptable from a commercial point of view because of the cost thereof.

Thus, most needled fabrics, being composed generally of organic fibers, find a variety of applications where relatively high physical properties are required, e.g. high strengths, with substantially uniform physical properties in both the longitudinal and transverse directions, and particularly in those applications where economics dictate the use of materials less expensive than woven fabrics or where the applications require more uniform thickness direction properties than can be provided by woven fabrics, e.g. as a heat insulator. However, since such needled fabrics are generally restricted to organic fibers, as noted above, the application of these needled fabrics has been substantially limited when higher temperatures are involved, especially where heat insulators are intended. Where heat insulators are intended, the art has been generally unsuccessful in providing needle fabric which will withstand such higher temperature, since the organic fibers of the needled fabrics have too low a softening temperature.

The art has attempted to overcome this difficulty by use of a number of different approaches. In one approach, as exemplified by U.S. Pat. No. 3,338,777, organic fibers and glass fibers are mixed. Such mixture of fibers significantly improves the ability to needle the glass fibers into a consolidated fabric of reasonable physical properties and improves the heat resistance of the fabric. However, this approach suffers from the disadvantage that the mixture of organic fibers and glass fibers decreases the resulting physical properties of the resulting fabric, as opposed to an all organic fiber fabric, due to the increased difficulty of needling the glass fibers into a fabric of high strengths. Further, the organic fibers mixed with glass fibers reduced the insulating properties of the glass fibers.

Aside from the foregoing difficulties in resulting properties, a needled mixture of organic fibers and glass fibers has recently been determined to have a most undesired health problem. In needling the mixture, glass fibers may be disposed throughout the thickness of the needled fabric, and including the surfaces thereof. The co-needling of the organic fibers and glass fibers, nevertheless, breaks many of the low stretchable and brittle glass fibers. These very small broken glass fibers are easily displaceable from the surface of the fabric when the fabric is in use and the displaced and broken (as well as unbroken) glass fibers will freely float in the air. If workers inhale these broken glass fibers, serious lung damage can result. Accordingly, for safety sake, use of such fabrics is considerably discouraged, or even prohibited, in many industries.

An attempt at a different approach is disclosed in U.S. Pat. No. 3,608,166, where organic fibers are used to needle "connecting" fibers through a glass fiber mat, preferably reinforced with a woven fabric, but that patent recommends oiling the glass fibers to avoid the problem of breakage and teaches using only about 12 to 15 needle punches per square centimeter. This is an unacceptably low number of needle punches and the resulting needled mat has low strengths.

U.S. Pat. No. 3,975,565 acknowledges that inorganic fibers are difficult to needle due to the relatively low stretch properties and brittleness of those fibers but goes on to disclose that it was found that inorganic fibers could be satisfactorily needled into a fabric by needle punching a combination of a mat of inorganic fibers and a web of organic fibers when the web of organic fibers is of a small thickness compared to the thickness of the mat of the inorganic fibers. During the needling process, the organic fibers are needled into the body of the mat of inorganic fibers and therefore hold the mat of inorganic fibers to the thin web of organic fibers. This provides a layered product with one layer being that of the inorganic fibers and one thin layer being that of the organic fibers. Thus, the properties of the layer of the inorganic fibers are substantially retained, and the layer of the organic fibers serves to hold the layer of inorganic fibers in place. This approach, therefore, offered the promise of a solution to one of the problems in the art, as identified above.

However, that approach suffers from a decided disadvantage. In practice, it was found that in needling the organic fiber layer to the inorganic fiber layer, needle punches of more than 260 punches per square inch could not be tolerated, since otherwise damage to the inorganic fibers occurred and that with needle punches of more than 260 per square inch, inorganic fiber damage resulted in more than a 25% loss of the inorganic fiber layer strength. Such a low number of needle punches per square inch is not capable of producing acceptable overall physical properties of the composite. In addition, the considerable breakage, during needling, of the inorganic fibers constitutes a very definite health hazard, as explained above in connection with the needled combination of organic fibers and glass fibers.

In U.S. Pat. No. 4,522,876, which is of common inventorship and ownership herewith, the entire disclosure of which is incorporated herein by reference, it is disclosed that a needled fabric may be prepared by needling a composite batt prepared from a glass fiber batt and an organic fiber batt, where the needling takes place from at least the side of the composite batt having the organic fiber batt. The needling must be carried out in a manner such that the glass fibers of the glass fiber batt are not substantially engaged by the barbs of the needles during the needling operation. With such lack of engagement, the needles can stitch organic fibers from the organic fiber batt into and through the glass fiber batt so as to bind the organic fiber batt to the glass fiber batt, while at the same time not substantially engaging, and, hence, breaking or displacing the glass fibers of the glass fiber batt. Stated another way, the needling is carried out in such a manner that the fibers of the organic fiber batt are needled into the glass fiber batt while the fibers of the glass fiber batt are left substantially undisturbed. By such a needling technique, almost any numbers of needle punches may be used in the process to form either a lightly needled or a highly needled organic fiber layer while at the same time not breaking or displacing the glass fibers of the glass fiber batt.

The resulting composite fabric has good physical properties due to the amount of needling of the organic fiber layer. Also with such needling, the stitching o the organic fibers into and through the glass fiber batt will so bind the glass fiber layer and the organic fiber batt that they are essentially nondetachable, one from the other. Even further, since such needling will not substantially displace glass fibers from the glass fiber batt into the organic fiber layer, the resulting needled organic fiber layer will be essentially free, at least on the outer surface thereof, of glass fibers. Thus, that surface avoids the health problem described above. Further, if the glass fiber batt is sandwiched between two organic fiber batts, and a similar needling takes place, from one or both sides of the sandwich, then again the resulting sandwiching organic fiber layers will not have glass fibers therein, at least on the outer surfaces thereof, and the entire resulting fabric will not pose the health problem described above.

The product of the aforenoted U.S. Pat. No. 4,522,876 has found wide acceptance. For example, it is used an insulator over the floorboard in the area of the catalytic converter and underneath the carpet of automobiles and trucks, in order to reduce the temperature of the carpet under the feet the passengers in such a vehicle. As disclosed in that patent, such an insulator is particularly advantageous, in that it can be easily assembled in producing the vehicle, without the health hazards noted above, while at the same time providing excellent insulation to the area of the floorboard over the catalytic converter. In practice, the insulating fabric of the aforementioned patent is attached to the material which is placed between the floorboard and the carpet of the vehicle so that the insulating fabric is strategically positioned over the catalytic converter, which is normally under the floorboard of the vehicle. The material placed between the floorboard and the carpet can be of a variety of materials, but very often that material is a non-woven product referred to as "shoddy" material, which is a felted material of waste fibers. The carpet, shoddy material and insulator are preassembled, as a one-piece unit, usually by a heat activated glue and press operation. Thus, when the unit is placed over the floorboard, the carpet, shoddy material and insulating fabric of the aforementioned patent are automatically placed at the correct position of the floorboard so that the insulating fabric is placed over the higher temperature of the floorboard generated by the catalytic converter thereunderneath. This considerably facilitates assembly of the carpet in the vehicle, since the insulating fabric of the aforementioned patent will automatically be placed in the correct position when the unit is placed over the floorboard. Sometimes, additional shoddy material is laid underneath the shoddy material, but not under the insulating fabric, in order to avoid any overall variations in thickness of the carpet as installed on the vehicle. The additional shoddy material may be feathered toward the edges of the carpet in order to make a smooth appearance.

While this is a very acceptable and widely used application of the insulating fabric of the aforementioned patent, it has now been discovered that there are certain difficulties associated therewith, especially in regard to certain installations in certain vehicles. In this regard, certain vehicles have areas of higher temperatures at the floorboard which are either more extensive than the areas immediately above the catalytic converter, or, in some cases, even areas which are spaced apart. For example, in many trucks, the exhaust pipes, at least in part, pass through the tunnel area of the floorboard and the area of the floorboard adjacent to those exhaust pipes can be heated to relatively high temperatures Thus, while the application of the insulating fabric of the aforementioned patent, as described above, can keep the temperature of the carpet under the feet of a passenger to acceptable limits in regard to the area over the catalytic converter, the other higher temperature areas, such as portions of the tunnel, can cause uncomfortable temperatures to the passengers of the truck. Further, when extended areas or multiple areas experience higher temperatures, the combined higher temperatures of these areas can make large sections of the floorboard uncomfortable for passengers.

Of course, multiple sections of the insulating fabric of the aforementioned patent could be strategically hand placed on the shoddy material for covering most of these extended areas of higher temperature, even when those extended areas are spaced apart, but this would considerably increase the hand labor cost of strategically placing the insulating fabric of the foregoing patent on the shoddy material. Further, it has been found that in certain vehicles, especially trucks, the temperature of the floorboard in localized areas is quite high, and the insulating fabric of the aforementioned patent is not sufficient, in the usual thicknesses produced, to adequately insulate those higher temperature areas. Of course, the insulating fabric of the aforementioned patent could simply be increased in thickness to achieve greater insulation, but this would result in substantial increases in the cost of that insulating fabric.

It would, therefore, be a substantial advantage to the art to provide a fabric which is capable of insulating higher temperature portions of the floorboard while at the same time providing that fabric such that unnecessary insulation is not used on areas of the floorboard which do not experience those higher temperatures.

BRIEF DESCRIPTION OF THE INVENTION

It has now been discovered that the insulating fabric of the aforementioned patent can be modified to provide additional insulation material for areas of higher temperature and that this additional insulation material can be provided with only a modest increase in the amount of insulating material required, by reason of strategically placing the additional insulating material in the insulating fabric of the aforementioned patent.

Thus, the present invention provides an integral textile composite fabric which is composed of two separate portions. The first portion is a substrate portion and has at least one organic textile fiber layer. The second portion is an insulating portion. This insulating portion has at least one inorganic fiber layer and at least one additional insulating layer. The inorganic fiber layer is substantially co-extensive with the organic fiber layer. In this regard, the term "co-extensive" means that the area of the inorganic fiber layer is substantially the same as the area of the organic insulating layer. The additional insulating layer, on the other hand, is substantially less than co-extensive with the organic fiber layer or inorganic fiber layer. Thus, the additional insulating layer will, therefore, be positioned in relationship to the organic fiber layer and the inorganic fiber layer, which are co-extensive, such that the additional insulating layer is contained in the composite only in those areas where higher temperatures will be experienced.

A plurality of first needle stitches composed of organic fibers from the organic fiber layer are needled in and disposed at least substantially through the insulating portion (the inorganic fiber layer and the insulating layer), while the inorganic fibers of the inorganic fiber layer are substantially undisturbed. This is the same needling concept as described in the aforementioned patent. The number of the stitches must be sufficient that the insulating portion is substantially non-detachable from the substrate portion (the organic fiber layer). In this latter regard, the term "substantially non-detachable" has the same meaning as described in the aforementioned patent. The needling is carried out in the manner of the aforementioned patent, such that the barbs of the needles are loaded with the organic fibers from the organic fiber layers when the needles pass through the insulating portion. Thus, the barbs of the needles cannot substantially engage the inorganic fibers of the inorganic fiber layer and break or otherwise deteriorate those fibers. This, as described in the aforementioned patent, avoids broken inorganic fibers from being displaced from the inorganic fiber layer to the outer surface of the organic fiber layer, and, thus, avoids the health hazard noted above. Therefore, the substrate portion is essentially free on its outer surface from inorganic fibers from the inorganic fiber layer or insulating material from the insulating layer.

The invention also provides a process for producing such a fabric. The process involves preparing a substrate portion having at least one organic textile fiber layer. An insulating portion is prepared, which insulating portion has at least one inorganic fiber layer, which is substantially co-extensive with the organic fiber layer, and at least one insulating layer of insulating material, which is substantially less than co-extensive with the organic fiber layer. The insulating portion is placed adjacent to the substrate portion to form a composite batt. The batt is needled from the substrate portion (organic fiber layer) whereby stitches composed essentially of the organic fibers from the organic fiber layer are needled in and disposed substantially through the insulating portion while the inorganic fibers of the inorganic fiber layer in the insulating portion are substantially undisturbed. The number of stitches is sufficient that the substrate portion is substantially non-detachable from the insulating portion. The substrate portion is essentially free on its outer surface from inorganic fibers from the inorganic fiber layer or insulating material from the insulating layer.

DETAILED DESCRIPTION OF THE INVENTION

Figure 1:
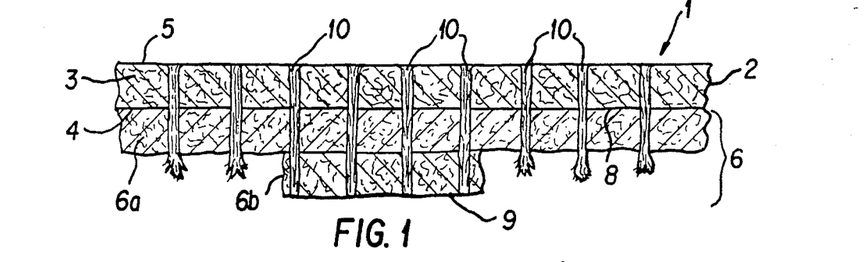
FIG. 1 is a diagrammatic illustration of a composite fabric according to the present invention composed of a substrate portion and an insulating portion, with a plurality of stitches passing therethrough.
Figure 2:
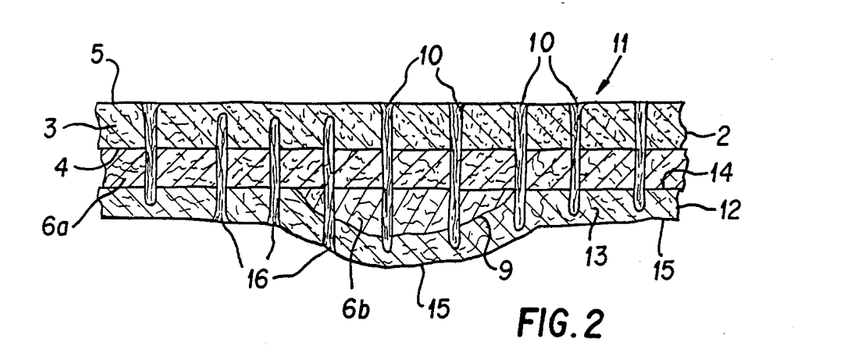
FIG. 2 is a diagrammatic illustration of a fabric similar to the fabric of FIG. 1, with the exception that the composite fabric has an additional outer portion such that the insulating portion is sandwiched between the substrate portion and the outer portion.

The invention can best be understood by first considering the diagrammatic illustrations of FIGS. 1 and 2 of the drawings. Both FIGS. 1 and 2 show a composite fabric. From FIG. 1 it will be seen that the fabric 1 is composed of a substrate portion 2, which is composed of at least one organic textile fiber layer of needled textile organic fibers 3, and substrate portion 2 has an inner surface 4 and outer surface 5. The fabric 1 also has an insulating portion 6 which is composed of at least one inorganic fiber layer 6a, e.g. of glass fibers, and at least one insulating material layer 6b, e.g. of glass fibers, and that insulating portion 6 has an inner surface 8 and an outer surface 9.

A plurality of first needled stitches 10 are composed essentially of organic fibers from the organic fiber layer of substrate portion 2 and are needled in and disposed substantially through insulating portion 6 so that the portions are bound together at the respective inner surfaces 4 and 8. These stitches provide such binding of substrate portion 2 and insulating portion 6 that the layers thereof are substantially non-detachable from each other and form an integral composite fabric. The amount of needling performed may also be to the extent that the needled fabric has high physical properties. To achieve these high physical properties, there must be at least 700 stitches per square inch passing through composite fabric. It will also be noted from FIG. 1 that the needling is such that substrate portion 2 is essentially free, at least on its outer surface 5, of inorganic fibers and insulating material displaced from the insulating portion 6, and its layers 6a and 6b.

Substrate portion 2 and insulating potion 6 are preferable needled from laid fibers, although the insulating material 6b may be other than fibers, as explained below. Fibers may be laid into a batt for needling purposes by a variety of known processes, including drafting, air laying, wet laying, and carding. However, it is most difficult to card inorganic fibers, e.g. glass fibers, into a laid batt and the more conventional air laying of such fibers is preferred. On the other hand, it is easy to card organic fibers into a laid batt and for that reason a carded layer of the organic fibers of substrate portion 2 is preferred. In any event, the layers to be needled are preferably laid layers and are to be distinguished from previously substantially consolidated (non-laid) layers, e.g. layers which may have been substantially consolidated by use of adhesives, thermal bonding, substantial prior needling, and the like. This does not mean, however, that there can be no previous consolidation of the laid layers. For example, commercially available glass fiber batts may have a small amount of resin binder therein in order to provide sufficient strength for handling purposes. Nevertheless, the glass fibers of such batts are essentially free to move and are therefore considered to be a "laid" batt.

It is preferred that the layers be laid layers so that the present needling of the organic fiber layer of substrate portion 2 may take place and the inorganic fibers of insulating portion 6 are sufficiently free to avoid engagement by the barbs of the needles. It will also be appreciated from the above that, for example, the laid glass fiber layer must also be of glass fibers which are not crimped, as disclosed in U.S. Pat. No. 3,338,777, but conventional uncrimped laid glass fibers, and this is intended to be a part of the definition of "laid" glass fiber layer.

Referring now to FIG. 2, it is preferable that the composite fabric 11 have an additional outer organic fiber layer 12. Again, layer 12 is of needled textile organic fibers 13, which may be the same or different fibers from that of the organic fiber layer of substrate portion 2, and that layer has an inner surface 14 and an outer surface 15. Layer 12 is preferable disposed with its inner surface 14 adjacent to the outer surface 9 of insulating material 6b and the inorganic fiber layer 6a, although the order of layers 6a and 6b may be reversed. The stitches 10 are also disposed in additional outer organic fiber layer 12 so that the additional outer layer is likewise bound to the outer surface 9 of insulating material 6b.

However, it is preferred that there is also a plurality of additional stitches 16, and again composed essentially of organic fibers from the additional outer organic fiber layer 12. Those stitches are needled in and disposed through the insulating portion 6 and into or through substrate portion 2. This further provides that the insulating portion 6 and the additional outer organic fiber layer 12 are similarly substantially non-detachable from each other and an integral composite fabric with all of portions 2 and 6 and layer 12 is provided. Again, if high physical properties are desired, the number of such additional stitches 16 is, preferably, at least 700 per square inch. However, very good physical properties can be obtained when the combination of first stitches 10 and additional stitches 16 are at least 700 stitches per square inch, provided that stitches 16 constitutes a significant portion of those 700 stitches per square inch. Both first stitches 10 and additional stitches 16 will pass through the insulating portion 6, and again additional organic fiber layer 12 will be essentially free, at least on its outer surface 15, of inorganic fibers displaced from inorganic fiber layer 6.

FIG. 2 shows the fabric where the first stitches 10 pass at least substantially through the additional outer organic layer 12 and additional stitches 16 pass at least substantially through the organic fiber layer of substrate portion 2. This is a preferred embodiment, since it provides better physical properties to the composite fabric.

In regard to the organic fibers themselves, any of the conventional synthetic organic textile fibers may be used, e.g. thermoplastic fibers, and especially the conventional polyester fibers, acrylic fibers, polyamide fibers, aramid fibers, polyvinyl chloride fibers, nylon fibers, poly (phenylene sulfide) fibers, polybenzoimidazole fibers, monoacrylic fibers, polyimide fibers, phenolic fibers and olefin fibers. Optionally, although not preferred, the organic fiber may be natural fibers, e.g. wool, cotton, hemp. In addition, mixtures of the foregoing organic fibers may be used, although it is preferred that synthetic organic fibers be used in the organic fiber layer. When the insulating material is a polymeric fiber, the insulating fibers may be the same as the organic fiber layer fibers, but it is preferred that the insulating fibers be the more heat resistant fibers, e.g. aramid fibers, monoacrylic fibers, polyimide fibers and phenolic fibers.

The inorganic fibers may be glass fibers, mineral fibers or vitreous fibers, but glass fibers are preferred, and, for sake of conciseness, hereafter only glass fibers will be, primarily, discussed. The glass fibers may be any of the conventional glass fibers, for example, the conventional vitreous glass fibers, C-glass fibers, S-glass fibers, E-glass fibers, air filtration-grade glass fibers, "range" grade fibers and the like, which glass fibers may or may not have a sizing thereon, e.g. a polysiloxane sizing.

The inorganic fibers of the inorganic fiber layer and/or the insulating material (when such fibers are used as the insulating material) may be of a color which is different from the organic fibers or a different color of separate inorganic fiber layers and/or layers of insulating material, so that the correct positioning thereof can be visually confirmed.

The denier of the organic fibers is preferably between about 1.5 and 25 denier, although more preferably that denier will be between about 2 and 15 denier. The fiber length of the organic fiber may be from 1 to 4 inches, although more usually the fiber length will be between 1.5 and 3 inches.

The inorganic fiber will have an average diameter of from about 1 micron up to about 25 microns, although more usually those fibers will have a diameter of from about 5 microns up to about 15 microns. The length of the fibers can vary substantially, since they do not substantially participate in the needling step, and may have lengths shorter than 1 millimeter up to as much as 20 millimeters, although more usually the length will be between 1 millimeter and 10 millimeters.

In a composite fabric having only one substrate portion 2 and only one insulating portion 6, as shown in FIG. 1, the weight ratio of the two portions may vary considerably. This is because the glass fibers do not participate in the needling step, as opposed to the above discussed U.S. Pat. No. 3,975,565, where the layer of organic fibers has a small thickness compared with the thickness of the layer of inorganic fibers. This is a necessity in that patent, since the organic fiber layer cannot be sufficiently needled with only up to 260 needle punches per square inch to provide any substantial consolidation of the organic fibers if the layer of organic fibers has appreciable thickness (and hence amount of fibers therein). Therefore, in the present invention, the ratio of the weight of the substrate portion 2 to the weight of insulating portion 6 can be from 1:10 to 10:1, and still a very good fabric can be obtained, but more usually, that ratio will be between 1:5 and 5:1 and more usually 1:2 and 2:1.

Also, the ratio of insulating material, in a cross section of the composite fabric which contains the insulating material, to the inorganic fiber layer is from 1:10 to 10:1, but more usually between 1:5 and 5:1, e.g. 1:2 and 2:1.

The degree of needling in punches per square inch which approximately equates with the number of stitches per square inch of organic fibers passing through the glass fiber layer, affects the detachability of the substrate portion from the insulating portion. Unless there are at least 300 stitches per square inch, the two portions are essentially not significantly attached to each other. The number of stitches must be to the extent that the two portions are substantially non-detachable from each other. This amount of needling will vary with the particular materials of the portions but can be easily determined by manually pulling the portions apart. If that manual pull is not significant, the portions are detachable; if that pull is significant, the portions are substantially non-detachable. Generally, about 400 stitches per square inch are required to ensure substantial non-detachability. If the number of such stitches per square inch is not at least about 400 and more usually at least about 500, then the portions can be manually detached from each other with only an insignificant manual pull. More usually, if the number of stitches is less than 700 per square inch, the composite fabric is of lower physical properties, but still substantially non-detachable. Above about 700 stitches, the portions are more difficult to manually detach and higher physical properties are provided. The term "detachable", in this regard, means that the portions can detach from themselves in use, e.g. during flexing in intended use, or can be relatively easily manually detached by digitally tearing apart the portions. However, to improve the non-detachability and provide very high physical properties, the number of stitches per square inch can be at least 1000, e.g. at least 2000 and for applications where extremely high physical properties are required, it is preferred that the stitches be at least 3000 per square inch, and more preferably 5000 to 8000 per square inch. As will be appreciated from the foregoing, a feature of this invention is the ability to place either small numbers or large numbers of stitches through the portions without substantially reorienting the fibers of the glass fiber layer and without substantially breaking or degrading the glass fibers of the glass fiber layer.

Again considering FIGS. 1 and 2, insulating portion 6, as noted above, comprises an inorganic fiber layer 6a and an insulating layer 6b. Also, as noted above, the fibers of the inorganic fiber layer are preferably glass fibers. However, the material of insulating layer 6b may be either fibrous or non-fibrous. When the insulating layer 6b is fibrous, the fibers thereof may be the same fibers as the inorganic layer 6a, i.e. may be glass fibers or mineral fibers or vitreous fibers, or mixtures thereof, but preferably are glass fibers, although other fibers may be used, e.g. wood fibers and polymeric fibers such as the same fibers as the organic fiber layer. When the insulating layer 6b is not fibrous, it may be of particulate material, e.g. wood chips or a foamed material, e.g. a polymeric foam such as foamed polyurethane, polyethylene, polystyrene, polyester, nylon, aramid, polyamide and polyvinyl chloride.

The choice of material for the insulating layer is much wider than the choices for the inorganic layer or the organic layer, since as shown in FIG. 2 the insulating layer can be sandwiched between the inorganic fiber layer 6a and the additional outer layer 12. Thus, while the needling may considerably disturb the materials of the insulating layer, e.g. particulated foamed polymer, this is not a problem, since the layers 6a and 12 will still fully contain the disturbed and particulated foam material. This is true even with particulated foam, since the insulating properties thereof will not be substantially reduced.

Figure 3:
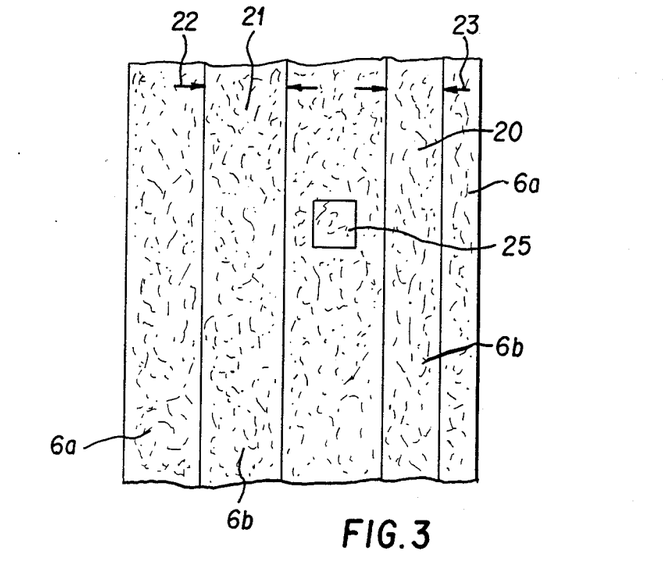
FIG. 3 is a diagrammatic illustration, in plan view, showing a composite fabric similar to that of FIG. 1, but with the exception that the fabric has spaced apart insulating material layers thereon.

FIG. 3 shows a plan view of the fabric of FIG. 1. As can be seen, the inorganic fiber layer 6a (which completely overlies organic fiber layer 2—which is thus not seen in FIG. 3) is co-extensive with organic fiber layer 2, i.e. it has the same dimensions and area. However, insulating layer 6b is substantially less than co-extensive with the inorganic fiber layer 6a. As shown in FIG. 3, the insulating layer 6b may be composed of one or at least two individual portions 20 and 21, although only one portion or more than two portions may be used. The portions may be spaced laterally from each other, as shown in FIG. 3. The insulating layer will, generally, be less than co-extensive with the inorganic layer by at least 10% by area, more usually by at least 30% by area and often by 50% by area. In many cases, the insulating layer will be less than co-extensive with the inorganic layer by at least 60% by area and up to 90 to 95% by area. In the illustration of FIG. 3, the insulating layer 6b is less than co-extensive with the inorganic layer 6a by about 60% by area (the insulating layer 6b covers about 40% by area of the inorganic layer 6a).

Usually, the insulating layer will have substantially uniform transverse dimension (width dimensions), as shown by arrows 22 and 23 and substantially uniform thicknesses (Z-direction dimension). However, for special purposes, the transverse dimensions and thicknesses may vary from portion to portion of the insulating layer, and FIG. 3 shows portion 20 to have a transverse dimension smaller than the transverse dimension of portion 21.

Likewise, while FIG. 3 shows portions 20 and 21 to be continuous running lengths, discrete portions may be used as shown by portion 25 in FIG. 3. Also, while FIG. 2 shows the insulating layer 6b to be between inorganic layer 6a and outer layer 13, obviously layer 6b could be between organic layer 2 and inorganic layer 6a. Also, when a very heavy composite fabric is required, e.g. 120 oz./square yard, it is advantageous to place at least one further layer of organic fibers between layers 6a and 6b. This is because in such heavy fabrics the organic fibers from portion 2 may be somewhat depleted from the needle barbs after passing through inorganic layer 6a, and thus further layers of organic fibers will refill the barbs before the needles pass into insulating material 6b, and prevent that layer from being substantially disturbed, as described above.

Also, when very heavy fabrics are required, e.g. 140 oz./square yard, a fabric such as shown in FIG. 2 may have an identical or modified additional series of layers 2, 6a and 6b carded and placed thereon, with subsequent further needling. This will produce a very heavy fabric by, in effect, producing the fabric of FIG. 2 on a substrate which is an already produced fabric of FIG. 2.

Figure 4:
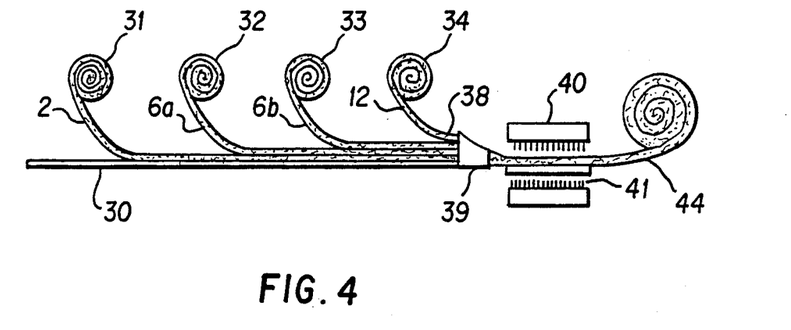
FIG. 4 is a diagrammatic illustration of apparatus for producing the composite fabric of the present invention.

FIG. 4 shows an apparatus for carrying out a process for preparing the present fabric. First, a substrate portion 2 of at least one organic fiber layer is prepared. This can be carded directly onto apron 30 or carded and rolled into a supply roll 31, as shown in FIG. 4. An insulating portion is prepared having at least one inorganic fiber layer 6a which is substantially co-extensive with organic fiber layer 2 and at least one insulating layer 6b of insulating material which layer of insulating material is substantially less than co-extensive with the inorganic fiber layer 6a. Again, layers 6a and 6b can be supplied by rolls 32 and 33 respectively. The insulating portion is placed adjacent to the substrate portion, as shown in FIG. 4.

While not required, it is preferred that an additional outer layer 12 be placed over the insulating portion and layer 12 is a layer of organic fibers, which again may be carded directly onto apron 30 or supplied by a pre-carded roll 34, as shown in FIG. 4.

The resulting batt 38 of layers is compressed, e.g. by a roller or a throat 39 and fed to a needling machine 40 having an array of needles 41, wherein batt 38 is needled from at least the organic fiber layer 2 side and preferably also from the additional outer layer 12 side, as shown in FIG. 4, whereby stitches composed of essentially organic fiber from the organic fiber layer (and preferably from the additional outer layer) are needled in and disposed substantially through the insulating portion, while the fibers of the inorganic fiber layer are substantially undisturbed. The number of stitches per square inch are sufficient that the substrate portion is substantially non-detachable from the insulating portion and the substrate portion is essentially free on its outer surface 44 from the inorganic fibers of the inorganic fiber layer 6a or insulating material from the insulating layer 6b.

Turning now to more details of the needling process to achieve the above needling, the needling may be carried out in any of the conventional needle looms, either single acting or double acting looms, but it is preferred that the needling be carried out with a double acting loom (needling from both sides) when sandwiching organic fiber layers, i.e. the organic fiber layer and the additional outer layer, are used. The known FIBERWOVEN (Trademark) loom, which loom not only needles from both sides, but needles in increasing needle density needling stations and the needles penetrate the fabric at an angle to the plane of the fabric, is well suited for such needling, but the more conventional double acting looms may equally be used.

The needles may vary considerably, but the blade of the needles may be between about 20 and 40 gauge with a regular barb, although a "formed" barb is preferred (a formed barb is smoothed, whereby it is less damaging to glass fibers). The needles may be single barbed or multiple barbed needles, but it is preferred to that when multi-barbed needles are used no more than 3 or 4 barbs per side of the needle is present.

The organic fiber layer (and the optional additional outer organic fiber layer) may be prepared by carding a batt of organic fibers by ordinarily carding machines. The glass fiber layer may be prepared by conventional laying mechanisms, e.g. air laying or wet laying, but since glass batts of this nature are commercially available, it is more convenient simply to obtain those batts from a commercial source. The batt of organic fibers and the batt of glass fibers may be laid in parallel, or cross-laid (cross-lapped) or combinations thereof. Since the glass fiber layer will not be substantially disturbed during the needling operation, this allows some design of the fabric by means of the laying of the batts. For example, since commercial glass fiber batts tend to be oriented in the direction of manufacture, e.g. air direction in air laying, the cross-laying of two or more glass fiber batts will achieve more random orientation of the glass fibers for better insulation properties.

On the other hand, the particular carding operation of the organic fibers can be important, depending upon the intended application of the fabric. For example, the organic fiber batt to be needled into the organic fiber layer or optional additional outer organic fiber layer may be composed of multiple carded fibers where the last or top most carded fibers are of very fine denier. These fine denier fibers at the surface are not substantially picked up by the barbs of the needles during the needling operation, which would otherwise distribute the fine fibers throughout the organic fiber layer and through the stitches of the glass fiber layer, but instead leaves a layer of fine denier fiber relatively intact in its carded position. By maintaining the layer of fine fibers near the face surface or the needled fabric, the fine fibers disposed at or near the face surface greatly increase insulation efficiency. Nonetheless, there is sufficient needling 10 of these fine fibers to intimately lock those fine fibers with the larger denier fibers in the organic fiber layer.

In order to provide the fabric of the present invention, as explained above in some detail, it is necessary to needle the fabric in such a manner that stitches of the organic fibers pass through the glass fiber layer, while at the same time the glass fiber layer is not substantially needled and left relatively undisturbed. It was determined that needling of such characteristics could be carried out in a number of different manners. The needling need only provide a combination of needling factors, especially the factors of fiber characteristics, fiber batt depth, needle barb size, number of barbs, needle barb penetration and needle barb configuration such that the barbs of the needles, and especially the first barb, are essentially filly loaded during passage through the organic fiber layer, or are loaded in a configuration, such that the fine diameter glass fibers cannot be substantially picked up by the needle barbs. While these factors admit to a great number of possible permutations, a selection of the possible permutations can be made such that with any particular groups of those factors, relatively few experiments will be required in order to find combinations of those factors which will produce the present needling. Thus, if a particular needle barb size and configuration is desired, for example, where the needle is already disposed in a conventional loom, then the particular organic fiber can be changed, or the denier of the fibers, or the length of the fibers, or the depth of the fiber batt can be changed until one of these combinations produces the present needling. On the other hand, if a particular organic fiber is desired, then the length of that fiber, the denier of that fiber, and the depth of the fiber batt can be changed until the present needling is achieved.

On the other hand, if a particular organic fiber of a certain denier and certain length is desired, then the barb configuration, size, depth and penetration, as well as the batt thickness can be changed until the present needling is achieved.

The only caveat to the foregoing is that in all cases, it is preferred that the needling be conducted in a manner where the initial stages of needling are designed such that less aggressive needling takes place, and in successive stages of needling more aggressive needling takes place. Those skilled in the art know now to design such increasing aggressiveness of needling, but briefly stated, the aggressiveness of needling depends upon prior compaction, e.g. roller compaction, of the batt to be needled, the number of needles displayed per square inch in a particular needling stage needling board, the size and configuration of the needle barb or barbs, and the depth of penetration of the needle barbs. Substantial compaction prior to needling is not normally either necessary or desirable and usually the compaction, e.g. by rollers, will be only to the extent of providing the batts in a thickness which is satisfactory for conveniently entering the first needling station of the particular looms being used.

Standard needle catalogues and like descriptions identify particular needle barb configurations for relative aggressiveness, especially toward different fibers and less aggressive needles may be easily chosen. However, usually the needles should not have more than 3 or 4 barbs along the blade of the needle on any one barb surface. For example, if a triangular blade needle is used, it should not have more than 3 or 4 barbs along each barbed edge of the triangled blade.

The barb configuration will normally be either a "regular" barb or a "formed" barb, especially as opposed to the aggressive "projecting" barbs (which project from the blade), e.g. as illustrated in U.S. Pat. No. 3,608,166. Regular barbs are disposed primarily within the blade and formed barbs are likewise disposed but additionally smoothed to be less aggressive. Barb depths will generally be smaller as opposed to the large depths for needling coarse fibers.

The penetration of the first barb of the needle will be substantially through the batts of layers being needled up to about 0.25 to 0.35 inch beyond the opposite side of the batts of layers from that side that the needles enter the batts of layers. Penetration much beyond this gives too aggressive needling, particularly in the earlier needling and with more aggressive needles.

The display of needles in the needle boards affect the aggressiveness of needling. The greater the number of needles per square inch which penetrate the batt of layers per stroke of a needle board, the more aggressive the needling. This is because more fibers are engaged by the larger number of needles during any one stroke and hence there is less fiber mobility and less opportunity for fibers to slip out of an engaging barb. With fewer numbers of needles per square inch per stroke, fiber mobility is greater and more fibers can slip out of engaging barbs, i.e. less aggressive needling. Likewise, if the barbs are, for example, formed barbs, the fibers can more easily slip out of an engaging barb and less aggressive needling takes place. Accordingly, the present needling should be conducted with numbers of needles per square inch per stroke and/or barb configuration and/or barb penetrations where less aggressive needling takes place.

The foregoing may also be adjusted for the ultimate number of needle punches per square inch which is desired. Hence, if a lower density fabric, with lower physical properties, is desired, then, for example, only 400 needle punches per square inch may be used. This can be achieved in a single needling station (two opposed needle boards) of a loom and all with the same needles. However, if a large number of needle punches per square inch is desired, then the number of needles per stroke in the earlier needling stages may be reduced with high numbers of needle punches per square inch in the latter needling stages. Alternatively, low aggressive needles may be used with the same numbers of needles in each needling stage but with a large total number of needle punches being used to provide the required fiber entanglement for a strong fabric. For example, one or more looms may be used with each needle board of 4 needling stages substantially filled with the same needles, and the present fabric will still result when low aggressive needles are used and the number of needle punches per square inch is at least 300, e.g. at least 400 or 700 for light density products and above 700, e.g. 2000–3000 or more, preferably 3000–4000, for high density products.

All of the above is designed to produce the present type of needling. Basically, this type of needling insures that the fiber engaging barbs of the needles are substantially loaded with organic fibers before penetrating the glass fiber layer or are so 10 loaded with organic fibers that engaged glass fibers can easily slip out of the so loaded barbs. Thus, the glass fiber layer is substantially undisturbed during needling while the organic fiber layer is fully needled.

The needled fabric may be sized or coated or filled or impregnated in a variety of manners as is common to the art. Thus, polytetrafluoroethylene sizes may be padded on and cured. Alternatively, polyacrylic sizings or other polymeric or natural sizings may be used. Fillers, e.g. kaolin, talc, etc. may be padded in the fabric. Coatings, e.g. polyethylene, acrylic and polyester coatings may be applied. Foam coatings, either in the expanded or crushed state, may be provided on the fabric. The fabric may be impregnated with a resin and cured to provide a more rigid structure, e.g. impregnated with an epoxie or polyester.

The surface of the fabric may be finished in conventional manners, e.g. calendaring, glazing, heat singeing. The glass layer may be placed in the batts for needling either alone or carried on a carrier, e.g. a light weight woven or non-woven scrim or remay.

In addition, the fabric may be combined with another fabric. For example, where a relatively thick fabric is desired, e.g. a highly insulating mat, the present fabric may be tacked to an inexpensive carrier fabric, e.g. a jute or cotton non-woven mat, or such a mat may be fed through the needling process and the present fabric and the mat are in situ attached. In lieu of a mat woven or knitted fabric may be used.

The invention is illustrated by the following example, where all percentages and parts are by weight, unless otherwise specified, as is also the case in the foregoing disclosure an following claims.

EXAMPLE

A carding machine carded 1.5 ounces per square yard each of aramid staple fibers (Nomex) into a cross-lapped batt. The staple fibers were crimped, had an average length of about 2 inches and an average denier of about 3. The width of the batt was about 6 feet. A second carding machine carded 2-inch, 3-denier, crimped polyester fibers onto the first carded batt into a cross-lapped batt of about 4 ounces per square yard. This second batt was also about 6 feet in width and was essentially co-extensive with the first batt. Between the first and second batt was fed a polyester remay. The remay carried about 14 ounces per square yard of range-type glass fibers (Owens-Corning). The glass fiber batt was also about 6 feet in width and was, thus, essentially co-extensive with the first and second batts. On top of the glass fiber batt was laid two running lengths of strips of the same glass fiber batt. Each strip was equally positioned from respective edges of the glass fiber batt and from each other. The strips were approximately one foot in width. The batts of layers were collected and moved on a floor apron and an inclined apron to a FIBER-WOVEN needle loom, with 4 needling stations and 2 needle boards per station. Each needle board was provided with FOSTER 5 needles. The needle density per board was such that in traversing the loom the resulting fabric had been needle punched about 600 punches per square inch.

The resulting fabric had a thickness of about 0.6 inch and an overall bulk density of about 4 lbs. per cubic foot. The layer of glass fibers and strips were sandwiched between the top layer of aramid fiber fabric and the bottom layer of polyester fiber fabric. The glass fiber layer and strips were quite distinct and visually (side view) separate from the sandwiching fabric layers. The sandwiching fabric layers were not easily manually torn from the glass fiber layer and strips, and it was visually observed that there were many stitches of aramid and polyester fibers passing through the glass fiber layer and strips. There were essentially no glass fibers on the outer surface of the aramid or the polyester fiber layers. The glass fiber layer and strips were essentially unneedled.

The fabric K-value was less than 0.26 at 24° C. and 0.31 at 93° C. The heat transfer from a 175° C. hot face gave a constant temperature of 110° C. on the cold face. The glass fiber layer and the strips were essentially undisturbed.

This insulator fabric functioned satisfactorily as a heat insulator between the carpet and metal floorboard of a truck when placed over the catalytic converter and tunnel.

What is claimed is:

1. An integral textile composite fabric comprising:
    A. a substrate portion having at least one organic textile fiber layer;
    B. an insulating portion having:
       (1) at least one inorganic fiber layer which is substantially co-extensive with the organic fiber layer, and
       (2) at least one insulating layer of fibrous, foamed or particulate insulating material which is substantially less than co-extensive with the inorganic fiber layer; and
    C. a plurality of first needled stitches composed of organic fibers from said organic fiber layer of said substrate portion needled in and disposed at least substantially through said insulating portion while the inorganic fibers of the inorganic fiber layer in the insulating portion are substantially undisturbed, and wherein the number of said stitches is sufficient that the insulating portion is substantially non-detachable from the substrate portion and the substrate portion is essentially free on its outer surface from inorganic fibers from the inorganic layer or insulating material from the insulating layer of the insulating portion.

2. The fabric of claim 1 wherein the inorganic fibers are selected from glass fibers, mineral fibers and vitreous fibers.

3. The fabric of claim 1 wherein the insulating material is selected from a foamed material and a fibrous material.

4. The fabric of claim 3 wherein the foamed material is a polymeric foam.

5. The fabric of claim 4 wherein the polymeric foam is foamed polyurethane, polyethylene, polystyrene, polyester and nylon.

6. The fabric of claim 3 wherein the fibrous material is made of wood fibers, glass fibers, mineral fibers and polymeric fibers.

7. The fabric of claim 6 wherein the polymeric fibers are fibers of polyurethane, polyethylene, polystyrene, polyester, nylon, aramid, acrylic, polyamide, polyvinylchloride, poly (phenylene sulfide), monoacrylic, polyamine, phenolic and polybenzoimidazole.

8. The fabric of claim 1 wherein the said insulating layer is less than co-extensive with the inorganic fiber layer by at least 10% by area.

9. The fabric of claim 8 wherein the insulating layer is less than co-extensive with the inorganic fiber layer by at least 30% by area.

10. The fabric of claim 8 wherein the insulating layer is less than co-extensive with the inorganic fiber layer by at least 50% by area.

11. The fabric of claim 8 wherein the insulating layer is less than co-extensive with the inorganic fiber layer by at least 60% by area.

12. The fabric of claim wherein the insulating layer is composed of at least two individual portions spaced laterally from each other.

13. The fabric of claim 1 wherein the insulating layer has substantially uniform transverse dimensions and substantially uniform thickness.

14. The fabric of claim 1 wherein the insulating layer is between the organic fiber layer and the inorganic fiber layer.

15. The fabric of claim 1 wherein the inorganic fiber layer is between the organic fiber layer and the insulating layer.

16. The fabric of claim wherein an additional outer layer of laid and needled textile organic fibers is adjacent the said insulating portion, and the said stitches are also so disposed in said outer layer portion so that said outer layer is bound to the insulating portion.

17. The fabric of claim 16 where a plurality of additional stitches composed essentially of organic fibers from the additional outer layer are needled in and disposed substantially through said insulating portion so that said additional outer layer is bound to said insulating portion, the said insulating portion and the said additional layer being substantially non-detachable from each other, and wherein said additional outer layer is essentially free, at least on the outer surface thereof, of inorganic fibers displaced from said insulating portion.

18. The fabric of claim 17 wherein the said first stitches pass at least substantially through said additional outer layer and said additional stitches pass at least substantially through said substrate portion.

19. The fabric of claim 16 wherein the amount of stitches is at least 400.

20. The fabric of claim 1 in the form of a heat insulator.

21. The fabric of claim 1 wherein the amount of stitches is at least 400.

22. The fabric of claim 1 wherein the amount of stitches is at least 700.

23. The fabric of claim 1 which has one or more of a coating thereon, a sizing thereon, a filler therein and an impregnating resin therein.

24. A process for the production of the fabric of claim 1 comprising:
    (1) preparing a substrate portion having at least one organic textile fiber layer;
    (2) preparing an insulating portion having at least one inorganic fiber layer which is substantially co-extensive with the organic fiber layer and at least one insulating layer of fibrous, foamed or particulate insulating material which is substantially less than co-extensive with the inorganic fiber layer;

(3) placing the insulating portion adjacent the substrate portion to form a composite batt; and (4) needling the batt from at least the organic fiber layer whereby stitches composed essentially of the organic fibers from the organic fiber layer are needled in and disposed substantially through the insulating portion while the fibers of the inorganic fiber layer are substantially undisturbed and the number of stitches is sufficient that the substrate portion is substantially non-detachable from the insulating portion and the substrate portion is essentially free, at least on its outer surface, from inorganic fibers from the inorganic fiber layer or insulating material from the insulating layer.

25. The process of claim 24 wherein there are more than one organic fiber layers.

26. The process of claim 25 wherein the organic fiber layers sandwich the glass fiber layer and the insulating material layer.

27. The process of claim 26 wherein there are more than one glass fiber layers.

28. The process of claim 24 wherein the aggressiveness of the needling is such that said glass fiber layer is substantially undisturbed during said needling.

29. The process of claim 28 wherein the aggressiveness of the needling is provided by one or more of the needle barb size, depth, configuration and penetration and organic fiber length, denier and composition.

* * * * *